Aug. 23, 1966  B. LINCOLN  3,268,072
METHOD OF AND APPARATUS FOR CLASSIFYING FIBRES BY LENGTH
Filed April 23, 1963  3 Sheets-Sheet 3

United States Patent Office 3,268,072
Patented August 23, 1966

3,268,072
METHOD OF AND APPARATUS FOR CLASSIFYING FIBRES BY LENGTH
Bernard Lincoln, Sale, England, assignor to Turners Asbestos Fibres Limited, Manchester, England, a British company
Filed Apr. 23, 1963, Ser. No. 275,142
Claims priority, application Great Britain, Apr. 24, 1962, 15,580/62
8 Claims. (Cl. 209—10)

Asbestos is commonly graded by fibre length, and my object in this invention is to provide a novel method and apparatus for grading or classifying asbestos or other fibres of substantially similar length to asbestos.

According to the invention liquid, usually water, is continuously supplied to the uppermost of a series of vessels mounted one above another, the bottoms of the vessels consisting of or comprising horizontal sieves of mesh sizes that decrease downwards, that is to say each sieve is of smaller mesh size than the one above it. The liquid flows continuously downwards through the vessels while a head of liquid is maintained in each vessel. The fibers to be classified are introduced into the uppermost vessel, and the contents of each vessel are maintained in motion to disperse the fibres in the liquid. It is found that the fibres are effectively classified by downward passage through the series of vessels, each sieve of course retaining fibres of length greater than its mesh size. The fractions of fibres of different lengths are then collected for weighing or examination or both.

The motion to disperse the fibres is preferably at least partly produced by rotating each vessel. In addition, or alternatively the contents of each vessel may be continuously mechanically stirred. Moreover the outlet from each vessel may advantageously discharge at a point intermediate between the centre and the periphery of the vessel below. The outlet may comprise a vertical or an inclined tube, and its end may terminate above or in the liquid in the vessel below. I find that in the uppermost vessels it is extremely important to maintain the fibres in dispersion, whereas in the lowermost vessels greater neede is to prevent clogging of the sieve. Dispersion is assisted by the introduction of a vigorous jet of liquid from the vessel above, and if this liquid enters through a vertical tube the outlet of the tube may be some distance above the sieve, but if it enters through an inclined tube the outlet of the tube may with advantage be closer to the sieve. In any event, the outlet is preferably constructed to produce a fan-shaped jet of liquid with fibres in suspension.

The appartus in which this method can be carried out is also part of the invention. It broadly comprises two or more rotary cylindrical vessels, each with its sieve at the bottom and with an outlet below the sieve discharging into the next vessel. It is desirable that the downward flow of liquid through the sieve should be as uniform as possible over the whole area of each sieve. Each sieve may advantageously be circular and supported at its edge by a funnel-shaped portion of the bottom of the vessel, this portion forming the outlet. We find that the best results are obtained when the funnel is of trumpet shape, flaring widely outwards at its upper end.

The number of vessels may vary in accordance with the requirements. One very suitable apparatus consists of four rotary vessels with sieves that decrease in mesh size progressively from the top sieve downwards and a stationary fine-mesh sieve below the bottom vessel.

The preferred apparatus according to the invention is illustrated in the accompanying drawings, in which.

Figure 1:
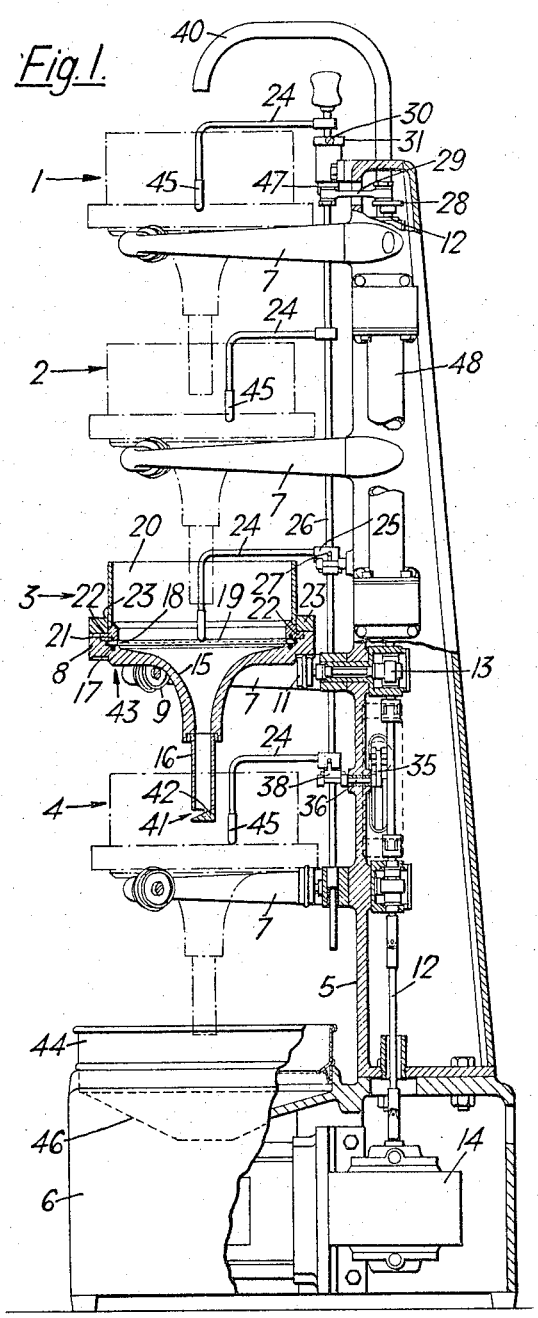
FIGURE 1 is a side view, partly in section of the apparatus.

The apparatus illustrated is suitable for classifying asbestos and comprises four rotary cylindrical vessels 1–4 carried by brackets 7 of a supporting frame 5 which extends upwards from a base 6. The bottom 43 of each rotary vessel includes a platform 8 by which the vessel is carried. The platform 8 is mounted to turn about a vertical axis on three supporting wheels 9, 10 and 11, which are mounted to rotate about horizontal axes, one of them, the wheel 11, being positively driven to rotate the platform 8 by friction. Each wheel 11 is rotated through appropriate gearing 13 from the same vertical, main driving shaft 12, which is driven by an electric motor 14 mounted in the base 6.

The bottom 43 of each vessel includes a funnel-shaped portion 15 and this funnel forms the outlet for the vessel. A discharge tube 16 extends downwards from the narrow end of the funnel 15, to terminate in the vessel below while the upper rim of the funnel 15 is surrounded by a resilient packing ring 17 on which rests the rim 18 if a circular sieve 19 which also forms part of the bottom 43. An open-ended cylinder 20 bears on the rim 18 through another resilient packing ring 21. The cylinder 20 carries lugs 22 that interlock bayonet wise with lugs 23 to combine the assembly of cylinder 20 and bottom 43, including its sieve 19, into a vessel. In addition to the sieves 19, there is a stationary fine mesh sieve 44 resting in the base 6 on the rim of a conically shaped depression 46 leading to a waste-pipe (not shown) for carrying away effluent liquid.

Each vessel is provided with a mechanical stirrer, which is an L-shaped rod 24 having a horizontal arm extending over and a vertical arm depending into the vessel, this arm terminating in a resilient rubber tip 45. Each of the upper two rods 24 is fixed to a shaft 26 and each of the lower two rods 24 is carried by a bush 25 which can slide freely on the shaft 26. The bush 25 is slotted and this slot co-operates with a a pin 27 on the shaft so that the rod moves with the shaft 26 when the pin is in the slot. Oscillatory angular motion is communicated to the shaft 26 by the shaft 12 through a crank 28, a connecting rod 29, a crank 47, a sleeve 31 and a horizontal pin 49 which engages in a vertical slot in the sleeve 31. All the stirrers can thus be raised together vertically independently of the sleeve 31 to a position in which a spring-loaded detent 30 engages a groove 50 in the shaft 26. The shaft 26 is then held in the raised position so that the stirring rods 24 can be swung away to allow the sieves to be removed at the end of a test. In addition, there is provision for altering the vertical position of each of the two lower rods 24 separately. In each of the height-adjusting mechanisms provided for this purpose there is a knob 32 mounted on a sleeve 33 which slides over a rod 34 between upper and lower positions defined at each end of the rod 34 by spring-loaded detents. The sleeve 33 moves a lever 35 which is pivoted by one end of a pivot rod 36 at its other end to the supporting frame 5. The other end of the rod 36 carries a short arm 37 which is pivotally connected to a bush 38 which can slide on the shaft 26. Upon raising or lowering the sleeve 33 the bush 38 is correspondingly raised or lowered. In the raised position the rods act simply as mechanical stirrers, while in the lowered position the rubber tips 45 bear against the sieves and, in operation, help to prevent clogging.

Flow of liquid into the apparatus from a pipe 40 is controlled by a needle valve 39 and is metered by a flow-meter 48.

As an example of mesh sizes suitable for classifying graded asbestos fibres, the sieves of the rotary vessels 1–4 may have apertures of 2.4 mm., 1.2 mm., 0.6 mm. and 0.3 mm., while the fine mesh sieve 44 may have apertures of 0.076 mm. Of course other mesh sizes (for example, of closer gradation) may be used as desired.

For the most efficient operation of the apparatus it is important to maintain a substantially constant head of liquid in each vessel. For this purpose the outlet end of each discharge tube 16 is constricted. In the construction illustrated in the drawings the discharge tube 15 is terminated at its bottom by a cylindrical rod 42 cut obliquely so as to present a flat surface inclined at an angle to the axis of the tube, and part of the wall of the tube is cut away immediately above the inclined surface of the rod 42 to form an orifice 41 of wedge-shape in the side of the tube. This form of orifice has a self-clearing tendency in that it increases in cross-sectional area in the direction of flow. In an alternative construction the end of the discharge tube 16 is flattened so as to give a rectangular orifice. Both these forms of orifice have the advantage of producing a flat jet of liquid, which is extremely desirable in order to obtain the desired turbulence in the vessel below the orifice and to prevent any persistent accumulation of stagnant fibre on the appropriate sieve 19.

Very short fibres such as those retained on the lower screens may impose an additional resistance to the flow of liquid through the screens, with the result that to maintain the desired constant head in the lowermost vessel 4, and possibly in the vessel 3, it is desirable to be able to adjust the size of the orifice during operation. An adjustable orifice which may be used for this purpose comprises a tube the end of which is partially closed by a tapered plug capable of being varied in position in relation to the end of the tube, e.g. being supported by a ring with internal threads which engage in external threads on the tube so that by rotation of the ring in relation to the tube the plug can be moved axially to vary the effective annular orifice.

In operation the motor 14 is switched on, a flow of water sufficient to maintain a constant head in all the vessels is established by running in water through the pipe 40, and a weighed quantity of asbestos or other fibre to be classified is introduced into the top vessel, say as a suspension in water. The water continues to flow for an adequate period of time, and by way of example I find that with four sieves of the mesh size indicated above, each 10 cm. in diameter, a rate of flow of about 4½ litres of water per minute for a period of 5 minutes is suitable in the classification of 2 grams of graded asbestos fibre. If the test were continued for longer than this period of time some refinement in classification might be produced, but this would be only of a very small order in the case of conventional graded asbestos. A longer time for classification is generally desirable with asbestos fibre which has received further opening treatment.

Figure 2:
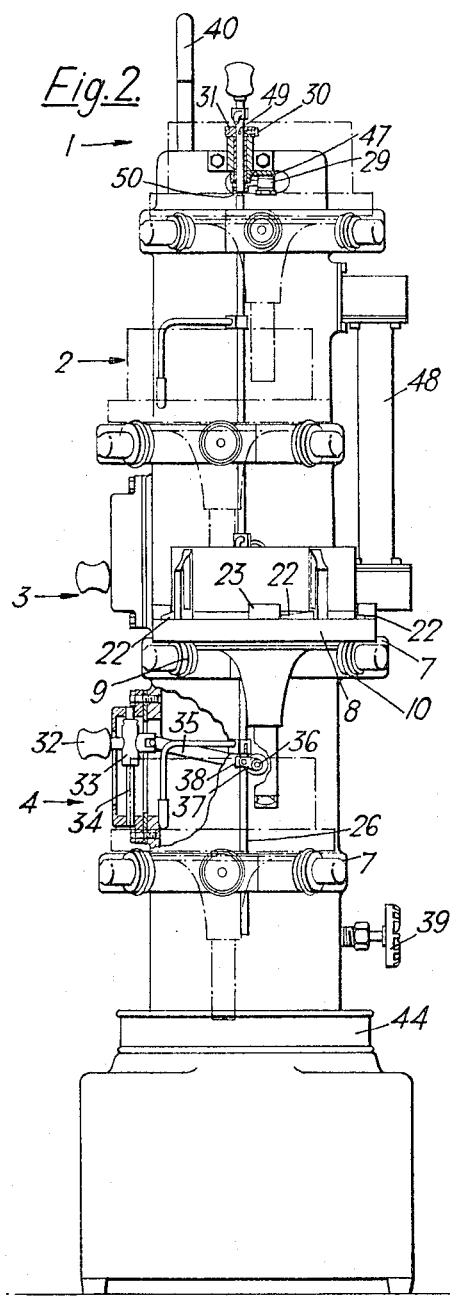
FIGURE 2 is a front view at right angles to the view of FIGURE 1, also partly in section.
Figure 3:
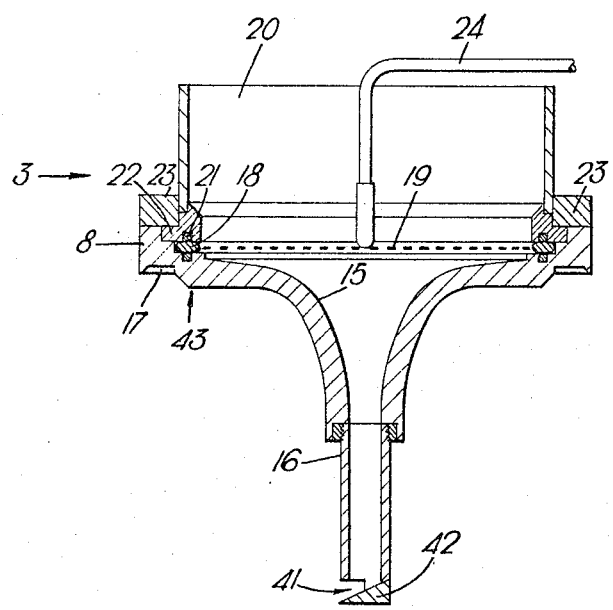
FIGURE 3 is an enlarged view of one of the vessels on FIGURE 1.

It will be noted from FIGURE 2 that the vertical axes of the vessels are offset in relation to one another. In this way optimum impingement of each outlet jet of liquid into the vessel below is secured, i.e. between the centre and periphery of the lower vessel. The vessels are advantageously rotated at different rates, particularly if the outlet jet from one vessel is directed obliquely into the liquid in the next vessel, so ensuring that the liquid jet impinges on different areas in that vessel in successive revolutions. The difference in speed between adjacent vessels may be for example in the ratio of 6:7 or 7:6. The stirring rods 24 are particularly useful for augmenting the agitation produced by the rotation of the vessels and the inflow of liquid in the upper vessels. The rate of oscillation of the stirrers is preferably not synchronous with the rate of rotation of the vessels, with the result that progressive sweeping of every part of each sieve surface is achieved.

The tips of the upper two rods 24 are maintained at a constant separation from the surface of the sieves with which they are associated. However, when the lower sieves show signs of clogging the two lower stirring rods may be lowered so that their tips 45 bear against the sieve surfaces and help to maintain in suspension the fibres which will not pass through the sieve.

The ease with which the sieves may be removed from the vessels at the conclusion of a run is particularly advantageous, and with sieves of a suitable size, having a diameter of say 10 cm., these may be placed under infra-red drying lamps together with the fibre fraction which has been collected on them in the test, thus eliminating the necessity for transferring the fibre to another supporting medium for the drying and weighing operation. This constitutes a significant economy in labour and time required for determining the length distribution of a sample of asbestos fibre. Additional sets of sieves may meanwhile be employed in the classifier for subsequent tests.

The following illustrative results demonstrate the way in which the preferred apparatus may be used to classify the fibres in grades of asbestos varying from Canadian Group 3 to Canadian Group 7.

| Canadian Group | Percentage by weight remaining on sieve of stated aperture size after 5 minutes classification | | | | | Less than 0.076 mm. by difference |
|---|---|---|---|---|---|---|
| | 2.4 mm. | 1.2 mm. | 0.6 mm. | 0.3 mm. | 0.076 mm. | |
| 3T | 40 | 22 | 10 | 4 | 7 | 17 |
| 4T | 5 | 20 | 23 | 12 | 15 | 25 |
| 5D | 3 | 10 | 20 | 15 | 17 | 35 |
| 5R | 0.5 | 5 | 15 | 17 | 20 | 42.5 |
| 6D | trace | 4 | 14 | 9 | 29 | 44 |
| 7D | 0 | 1 | 4 | 14 | 28 | 53 |
| 7M | 0 | 0.5 | 0.5 | 3 | 28 | 68 |
| 7R | 0 | trace | 0.5 | 3 | 25 | 61.5 |

I claim:
1. A method of classifying asbestos fibres of different lengths which comprises supplying liquid continuously to the uppermost of a series of vessels mounted one above another, removable independently of one another with the upper edge of each vessel spaced below the lower edge of the next higher vessel, the bottoms of the vessels including horizontal sieves of mesh sizes that decrease downwards from one vessel to the next, the screen surfaces of said sieves being substantialy planar, introducing fibres to be classified into the uppermost vessel, agitating the material in the uppermost vessel, maintaining a continuous downward flow of liquid through the vessels and a substantially constant head of liquid in each vessel, collecting the liquid from each vessel and discharging the collected liquid into the vessel below as a jet the axis of which intersects the sieve of such vessel at a point between the center and the periphery of the vessel to maintain the contents of the vessel below in a state of turbulence and thus to assist in dispersing the fibres in the liquid, whereby the longer fibres in a vessel are retained in that vessel as the liquid passes through the sieve in that vessel carrying with it the shorter fibres, and collecting the fibres accumulated in each vessel as a separate fraction.

2. A method according to claim 1 in which each vessel is rotated in order to further assist dispersion of the fibres in the liquid.

3. A method according to claim 1 in which the liquid in each vessel is mechanically stirred continuously in order to further assist dispersion of the fibres in the liquid.

4. A method of classifying asbestos fibres by length which comprises supplying liquid continuously to the uppermost of a series of vessels mounted one above another removable independently of one another with the upper edge of each vessel spaced below the lower edge of the next higher vessel, the bottoms of the vessels including horizontal sieves of mesh sizes that decrease downwardly from one vessel to the next, the screen surfaces of said sieves being substantially planar, introducing fibres to be classified into the uppermost vessel, agitating the material in the uppermost vessel, maintaining a continuous downward flow of liquid through the vessels and a substantially constant head of liquid in each vessel, collecting the liquid from each vessel and discharging the collected liquid into the vessel below as a jet the axis of which intersects the sieve of such vessel at a point between the center and the periphery of the vessel to maintain the contents of the vessel below in a state of turbulence and thus to assist in dispersing the fibres in the liquid, discontinuing the supply of liquid, the fibres accumulated in each vessel thereby being deposited in the sieve in the vessel, removing each sieve from the vessel with which it is associated, drying the sieve carrying the fibres and weighing it.

5. Apparatus for classifying asbestos fibres of different lengths comprising at least two upright cylindrical vessels, means mounting said vessels one above the other spaced apart from one another so as to facilitate the removal of the contents of each vessel independently of the other vessels, means mounting each vessel for rotation about its axis, said mounting means permitting each vesset to rotate at a speed different from the speed of other vessels, in which apparatus each vessel includes a substantially planar horizontal sieve, means for collecting liquid passing through the sieve and for discharging the collected liquid into the next lower vessel as a jet having its axis intersecting the sieve of such next lower vessel at a point between the center and the periphery of that sieve, the mesh size of the sieves decreasing downwards from one vessel to the next.

6. Apparatus according to claim 5, in which said collecting means comprises a funnel-shaped portion which forms the outlet for said vessel, said sieve being supported at its periphery by said funnel-shaped portion.

7. Apparatus according to claim 5 in which there are four upright cylindrical vessels which are rotatable and in which there is a fine mesh sieve above a stationary vessel which is placed below the lowest of said upright rotatable vessels.

8. Apparatus for classifying asbestos fibres of different lengths comprising at least two cylindrical vessels mounted one above the other and each comprising an open ended cylinder, the upper edge of each cylinder being spaced from the lower edge of the next higher cylinder, a funnel leading downwards from said cylinder to the vessel below and including means to discharge liquid in a jet at a point between the center and the periphery of the vessel below, means releasably locking the base of each cylinder to the upper rim of the funnel, a horizontal substantially planar sieve releasably trapped between the base of the cylinder and the upper rim of the funnel, and means mounting each vessel for rotation about a fixed axis, said mounting means permitting each vessel to rotate at a speed different from the speed of other vessels, so as to facilitate the dismantling of each vessel independently of the other vessels.

References Cited by the Examiner

UNITED STATES PATENTS

| 432,024 | 7/1890 | Farrington | 209—387 |
| 846,140 | 3/1907 | Rapp | 209—270 |
| 873,390 | 12/1907 | Stevenson | 209—271 |
| 909,006 | 1/1909 | Magnant | 209—357 |
| 2,155,587 | 3/1939 | Fairbank | 209—12 |
| 2,848,110 | 8/1958 | Hurst | 209—332 |
| 2,865,506 | 12/1958 | Velke | 209—319 |
| 3,047,151 | 7/1962 | Hurst | 209—332 X |
| 3,061,095 | 10/1962 | O'Malley | 209—12 |

FOREIGN PATENTS

| 439,940 | 4/1912 | France. |
| 849,798 | 9/1952 | Germany. |

HARRY B. THORNTON, *Primary Examiner.*

R. HALPER, *Assistant Examiner.*